United States Patent
Kappaun et al.

(10) Patent No.: US 9,260,615 B2
(45) Date of Patent: Feb. 16, 2016

(54) ADHESION-PROMOTING ADDITIVE FOR AN INK FOR IMPRINTING GLASS

(75) Inventors: Stefan Kappaun, Groß Sankt Florian (AT); Emil J. W. List, Graz (AT); Michael Graf, Bruck an der Mur (AT)

(73) Assignee: Durst Phototechnik Digital Technology GmbH (AT)

( * ) Notice: Subject to any disclaimer, the term of this patent is extended or adjusted under 35 U.S.C. 154(b) by 1092 days.

(21) Appl. No.: 12/997,725

(22) PCT Filed: Jun. 10, 2009

(86) PCT No.: PCT/AT2009/000232
§ 371 (c)(1),
(2), (4) Date: Feb. 24, 2011

(87) PCT Pub. No.: WO2009/149482
PCT Pub. Date: Dec. 17, 2009

(65) Prior Publication Data
US 2011/0143047 A1    Jun. 16, 2011

(30) Foreign Application Priority Data
Jun. 12, 2008    (AT) .................................. A 945/2008

(51) Int. Cl.
*C09D 11/101* (2014.01)
*C09D 11/03* (2014.01)
*C09D 11/38* (2014.01)
*C08K 5/54* (2006.01)

(52) U.S. Cl.
CPC .............. *C09D 11/101* (2013.01); *C09D 11/03* (2013.01); *C09D 11/38* (2013.01); *C08K 5/54* (2013.01); *C08K 2201/014* (2013.01)

(58) Field of Classification Search
CPC ...... C09D 11/03; C09D 11/38; C09D 11/101; C08K 5/54; C08K 2201/014
USPC ................. 106/481, 31.75; 524/265
See application file for complete search history.

(56) References Cited

U.S. PATENT DOCUMENTS

| | | | |
|---|---|---|---|
| 4,045,397 A | 8/1977 | Parkinson | |
| 4,338,133 A | 7/1982 | Toyoda et al. | |
| 5,424,357 A * | 6/1995 | Larson | 524/765 |
| 6,110,593 A * | 8/2000 | Szum et al. | 428/383 |
| 6,264,730 B1 | 7/2001 | Matsumura et al. | |
| 6,461,419 B1 | 10/2002 | Wu et al. | |
| 6,562,172 B1 | 5/2003 | Kamen et al. | |
| 6,582,804 B2 | 6/2003 | Wu et al. | |
| 6,677,106 B2 * | 1/2004 | Blum et al. | 430/302 |
| 6,719,422 B2 | 4/2004 | Wu et al. | |
| 2002/0061939 A1 | 5/2002 | Cavazos-Gutierrez | |
| 2003/0007050 A1 | 1/2003 | Wu et al. | |
| 2003/0031843 A1 | 2/2003 | Wu et al. | |
| 2004/0081847 A1 * | 4/2004 | Aechtner et al. | 428/545 |
| 2004/0110868 A1 | 6/2004 | Zhu et al. | |

FOREIGN PATENT DOCUMENTS

| | | |
|---|---|---|
| DE | 19515756 A1 | 10/1996 |
| DE | 69603256 T2 | 11/1999 |
| DE | 69701873 T2 | 1/2001 |
| EP | 1010739 A1 | 6/2000 |
| JP | 53063106 | 6/1978 |
| JP | 55017566 | 7/1980 |
| JP | 08048923 | 2/1996 |
| JP | 10060349 | 3/1998 |
| JP | 2000178494 A | 6/2000 |
| JP | 2002511805 A | 4/2002 |
| JP | 2005525435 A | 8/2005 |
| JP | 2008214576 A | 9/2008 |
| WO | 9852700 A1 | 11/1998 |
| WO | 00/09332 A1 | 2/2000 |
| WO | 01/32789 A1 | 5/2001 |

OTHER PUBLICATIONS

Fan et al., Nature, 405; 56-60 (2000).
Hector, A. L. Chem. Soc. Rev. 36; 1745-1753 (2007).
Mackenzie, J. D.; Bescher, E. P. Acc. Chem. Res., 40; 810-818 (2007).
International Search Report, PCT/AT2009/000232, dated Nov. 10, 2009.

* cited by examiner

*Primary Examiner* — Elena T Lightfoot
(74) *Attorney, Agent, or Firm* — Lerner, David, Littenberg, Krumholz & Mentlik, LLP

(57) ABSTRACT

The invention relates to an adhesion-promoting additive for an ink for imprinting glass comprising at least one silane, and at least one reticulating agent based on an organic ester of o-silica.

15 Claims, No Drawings

ADHESION-PROMOTING ADDITIVE FOR AN INK FOR IMPRINTING GLASS

CROSS REFERENCE TO RELATED APPLICATIONS

The present application is a national phase entry under 35 U.S.C. §371 of International Application No. PCT/AT2009/000232, filed Jun. 10, 2009, published in German, which claims the benefit of Austrian Patent Application No. A945/2008, filed Jun. 12, 2008. The disclosures of said applications are incorporated by reference herein.

BACKGROUND OF THE INVENTION

The invention relates to an adhesion-promoting additive for an ink for imprinting glass comprising at least one silane, an ink comprising at least one solvent, an adhesion-promoting agent and a pigment, a method for printing a surface of glass with an inkjet printer, wherein ink is applied in the form of droplets onto the surface of the glass, as well as the use of the additive.

The decoration or marking ("labelling") of glass and glass products is important in many areas of business. There is an enormous demand in the field of architecture for individually designed glass both for internal and external use, in the automotive field, in advertising, in the field of decorating household objects etc. Whilst large amounts of identically printed glasses and glass products are usually produced by screen-printing methods, inkjet printer applications for printing individually designed glass in small batches or with frequently changing motifs are an interesting alternative.

For decorative inkjet printing on different substrates, such as e.g. plastics, paper, etc., there are a number of pigmented organic ink formulations, which can be cured thermally or by UV radiation. Despite the amount of inks available said formulations have considerable disadvantages with regard to their adhesion onto glass, their scratch-resistance and resistance to water or solvents.

Alternative approaches involve burning in inorganically pigmented inks. Said formulations, which in addition to pigments and other typical ink components also often contain fritted glass (e.g. bismuth oxide, lead-containing materials etc.), after the burning process have good resistance to abrasion and the effect of water and solvents, but due to the toxicity of some pigments and fritted glass, the difficulty of grinding pigments and fritted glass, and due to the complicated burning-in process are uneconomical to use and may be unhealthy.

For these reasons for many applications, which have strict requirements with regard to adhesion and scratch resistance, attempts have been made to modify UV or thermally curable organic graphic inks so that the criteria required for glass printing are satisfied. In this case, various different solution strategies have been pursued, including in particular the admixing of organic polymers (e.g. novolac resins, silicon resins) to increase scratch resistance. Likewise attempts have been made to increase the stability of glass printing by applying various primers (e.g. Pyrosil®). Furthermore, the admixing of silanes for the covalent bonding of the printed pattern onto the glass surface is known from the prior art.

Thus e.g. DE 696 030256 T2 describes an ink composition for an inkjet printer which has improved adhesion and abrasion resistance on glass, PET or aluminium in humid conditions. The composition comprises an organic solvent, a flexible thermoplastic polyurethane resin, a colouring means, a silicon resin and a silane. The proportion of silane is between 0.5 wt. % and 2.5 wt. %. Epoxy alkyl oxysilane and amino alkyl alkoxy silane are given as the silanes.

From DE 697 01 873 T2 an inkjet printing ink for marking containers, such as bottles, is known, which during the printing can have a film of condensation on their surface. In order to address this problem an alkoxysilane polyalkylene imine is added as an adhesion accelerator to the printing colour.

BRIEF SUMMARY OF THE INVENTION

The underlying problem addressed by the present invention is to improve the applicability of inkjet printing on glass surfaces.

DETAILED DESCRIPTION OF THE INVENTION

Said problem of the invention is solved independently in that the aforementioned additive contains at least one reticulating agent based on an organic ester of o-silica, by the ink which contains said additive, and also by the method which uses said ink, as well as by the use of the additive as an admixture to an ink for inkjet printing.

By using an ester of o-silica on the one hand a reticulating agent similar to the glass material is obtained, whereby partly the structure of the glass can be replicated, on the other hand by means of the variation of the ester groups the close mesh or wide mesh of the network and thereby the mechanical stress-ability can be influenced. In this way the ink can be easily adapted to the respective requirements, for example it can be removable on the one hand when printing bottles and on the other hand more permanent, that is resistant to abrasion, when decorating glass.

In this way it is also possible to achieve improved resistance of the print to water. In particular, with the additive according to the invention by means of the achievable degree of networking or cross-linking the scratch resistance of the printing can be improved.

By means of the silane-based, cross-linking components, on the one hand, a covalent bonding of the print to the hydroxyl groups of the glass surface is achieved and, on the other hand, thus also at least partly the cross-linking with the ink and possibly the ester of the o-silica is achieved, whereby a greater resistance to abrasion can be achieved.

Preferably, the ester of the o-silica is selected from a group of compounds with the general formula $SiO_4R_uR_vR_wR_x$, wherein $R_v$, $R_w$, $R_x$ are formed respectively by H or a C1-C8 group and $R_u$ is a C1-C8 group. Said C1-C8 groups can in addition also carry functional residues, such as e.g. acrylates, glycols, amines, esters, amides, acids, epoxides, etc. In particular, with these substances a significant improvement in the scratch resistance is achieved, as in this way a greater degree of crosslinking can be achieved with a relatively fine-meshed network.

The ester of o-silica is added to the additive preferably in a proportion which is selected from a range with a lower limit of 1 wt. % and an upper limit of 90 wt. %. Below 1 wt. % cross-linking occurs but it is not significant enough to improve the scratch resistance substantially.

Above 90 wt. % no additional improvement could be observed with regard to the scratch resistance. Although this proportional range is very broad it should be noted that lower contents of ester are used preferably for removable printing e.g. on bottles, where an improved scratch resistance is desirable but need not be permanent, whilst higher contents up to the upper limit of the given range are used preferably for glass which is normally in use for a longer period.

The proportion of ester of o-silica in the additive can also be selected in particular from a range with a lower limit of 5 wt. % and an upper limit of 80 wt. % or from a range with a lower limit of 20 wt. % and an upper limit of 60 wt. %.

It is also possible within the scope of the invention to replace a proportion of the ester of o-silica with an organic polymer or its monomer prestages. In this way not only the cross-linking behaviour of the additive and the thus provided ink can be influenced in order to improve the printability of the ink, but in this way also additional properties of the ink, such as e.g. flexibility and flow behaviour, can be varied. Also the cost structure of the additive can be altered positively in this way.

Although it is possible within the scope of the invention to use as the organic polymer or its monomer prestages polymers known for graphic inks, it has proved advantageous owing to the functional groups of the polymers or their monomer prestages, if the organic polymer or its monomer prestage is selected from a group comprising acrylates, silicons, polyurethanes, polyamide resins, polyimide resins.

The proportion of organic polymer or the monomer prestage in the additive can thus be selected from a range with a lower limit of 0.5 wt. % and an upper limit of 50 wt. %. Below 0.5 wt. % the desired effect is too small so that the partial replacement of the ester by the organic polymer or its monomer prestage is more expensive due to the greater effort of handling, than the associated gain in quality of the additive. Above 50 wt. % a worsening of the scratch resistance of the printed image was observed which cannot compensate the positive properties achieved by the replacement.

The proportion of organic polymer or its monomer prestage in the additive can be selected in particular from a range with a lower limit of 5 wt. % and an upper limit of 40 wt. % or from a range with a lower limit of 10 wt. % and an upper limit of 30 wt. %.

According to a preferred embodiment the at least one silane is selected from a group comprising silanes, which comprise as a functional group an epoxide, an amine, a (meth)acrylic acid or a mercapto group. In particular, said functional groups owing to their reactivity have a positive influence on the cross-linking behaviour of the graphic ink or the adhesion of the ink onto the surface of the glass.

It is an advantage in this case, if the functional group is arranged at the end of the silane, as in this way a greater cross-linking speed can be achieved, and thus the printed image is of higher quality, as there is less of a risk that the ink will run on the glass before hardening.

In particular, for these reasons 3-glycidyloxypropyltrimethoxysilane and/or 3-aminopropyltriethoxysilane and/or 3-methacryloxypropyltrimethoxysilane are preferred.

The proportion of the at least one silane can be selected from a range with a lower limit of 1 wt. % and an upper limit of 80 wt. %. Below 1 wt. % the adhesion of the ink to the glass is significantly reduced. In addition, since the silane acts as a cross-linking component also the cross-linking behaviour of the additive or the thus provided ink is worsened. Above 80 wt. % brittle printing patterns are obtained, which in the case of mechanical or thermal loading have a tendency to crack.

The proportion of the at least one silane can be selected in particular from a range with a lower limit of 5 wt. % and an upper limit of 70 wt. % or from a range with a lower limit of 8 wt. % and an upper limit of 50 wt. %.

According to a particular embodiment of the invention the additive contains a silane, which comprises as a functional group an epoxide, an amine and a (meth)acrylic acid group, wherein the ratio of said silanes is selected from a range with a lower limit of 1:0.1:50 and an upper limit of 1:1:1.

Said ratio can also be selected from a range with a lower limit of 1:0.2:5 and an upper limit of 1:0.5:5 or from a range with a lower limit of 1:0.1:1 and an upper limit of 1:0.4:5.

The hardening properties of the ink according to the invention can be improved in that at least one UV initiator and/or a thermal initiator is added to the additive. By means of said initiator the degree of cross-linking or the hardening characteristic of the printed image can be controlled. In this way also the post-hardening can be accelerated, if this is performed.

The initiator can be included in a proportion, which is selected from a range with a lower limit of 0.5 wt. % and an upper limit of 25 wt. %. Below 0.5 wt. % an improved effect was observed but only on a small scale. Above 25 wt. % the degree of cross-linking becomes too high and thus—although the scratch resistance can be improved with higher contents—the hardness of the printed image is too high. Similarly, a further increase in the initiator content leads to a considerable increase in costs.

The initiator can be included in particular in a proportion, which is selected from a range with a lower limit of 2 wt. % and an upper limit of 10 wt. % or is selected from a range with a lower limit of 5 wt. % and an upper limit of 15 wt. %.

In order to improve the adhesion or the covalent bonding of the printed image on the glass surface the additive may contain at least one surfactant. By means of the surfactant the surface is better prepared, in particular the interfacial tension is reduced, whereby also the printing on the glass surfaces can be performed more effectively with an adhesive condensate film. In addition, by means of the surfactant any cloudiness in the additive is avoided if the latter is in liquid form, whereby higher proportions of additive to ink are made possible. In this way also the storage stability of the additive can be improved.

During the testing of the additive it proved to be advantageous, if the proportion of surfactant or surfactant mixture in the additive is selected from a range with a lower limit of 1 wt. % and an upper limit of 60 wt. %.

In particular, this proportion can also be selected from a range with a lower limit of 5 wt. % and an upper limit of 15 wt. % or from a range with a lower limit of 20 wt. % and an upper limit of 50 wt. %.

According to one embodiment variant of the ink, the proportion of additive is selected from a range with a lower limit of 5 wt. % and an upper limit of 70 wt. %. Below 5 wt. % it was observed that the adhesion of the printed image on the glass surface was too low and that scratch resistance was no longer provided. Above 70 wt. % the hardness of the print increases over-proportionally, so that the printed image became brittle and cracked.

The proportion of additive can be also be selected from a range with a lower limit of 10 wt. % and an upper limit of 65 wt. % or from a range with a lower limit of 15 wt. % and an upper limit of 55 wt. %.

On the one hand, in order to provide the ink with a suitable flow behaviour on the glass (i.e. to ensure sufficient wetting), but to avoid flowing over a large area and thus worsening the quality of the print and prevent the clogging of the printer nozzles, it is an advantage if the ink contains at least one viscosity regulator, wherein the ratio of the total amount of viscosity regulator to the amount of additive is selected from a range with a lower limit of 0.1:1 and an upper limit of 3:1.

Said ratio can be selected in particular from a range with a lower limit of 1:1 and an upper limit of 2:1 or from a range with a lower limit of 0.5:1 and an upper limit of 1.5:1.

In order to achieve sufficient hardening of the ink matrix or to enable the simultaneous printing of several colours, it is an advantage if the ink is fixed or hardened thermally and/or by means of UV-radiation after application onto the surface of the glass. The complete hardening (including covalent bonding onto the glass surface) can be performed in a thermal post-hardening stage.

Said thermal post-hardening can be performed over a period, which is selected from a range with a lower limit of 30 seconds and an upper limit of 15 minutes. Below 30 seconds the post-hardening was ineffective. Above 15 minutes no further improvement in the post-hardening effect could be observed.

The post-hardening can also be performed for a period which is selected from a range with a lower limit of 3 minutes and an upper limit of 12 minutes or from a range with a lower limit of 5 minutes and an upper limit of 10 minutes.

Preferably, the thermal post-hardening is carried out at a temperature which is selected from a range with a lower limit of 100° C. and an upper limit of 250° C. Below 100° C. post-cross-linking occurs, but only slowly so that the processing time has to be extended accordingly without additional measures being necessary. Above 250° C. no further increase in the effect of post cross-linking could be observed. In addition, with a further increase in temperature the correct choice of ink composition should be ensured as at higher temperatures the latter can decompose (e.g. pyrolytic reactions, vaporising of ink components prior to cross-linking etc.). It should be noted here, that the additive according to the invention also with respect to the maximum temperature limit has advantages over carbon-based additives, which at raised temperatures are often inclined to thermal reduction reactions, etc.

For a better understanding of the invention the latter is explained in more detail with reference to the following description and examples.

Firstly, it should be noted that all of the details relating to value ranges in the present description are defined such that the latter include any and all part ranges, e.g. a range of 1 to 10 means that all part ranges, starting from the lower limit of 1 to the upper limit 10 are included, i.e. the whole part range beginning with a lower limit of 1 or above and ending at an upper limit of 10 or less, e.g. 1 to 1.7, or 3.2 to 8.1 or 5.5 to 10.

As already explained above, the additive according to the invention is preferably used for inks, in particular graphic inks for printing glass. However, such inks can also be used for printing other materials with smooth surfaces which have similar properties to glass, for example different plastics.

With the exception of the additive the ink consists of the usual components. Thus colours or pigments known from the prior art can be used. In particular for colour printing the colours cyan, magenta, yellow and black are used. Suitable colours are listed e.g. in the aforementioned cited documents of the prior art.

The colourants are dissolved or dispersed in an organic solvent. Suitable solvents or dispergents are various different alcohols, such as e.g. methanol, ethanol, isopropanols, butanols, and higher homologues; ketones such as e.g. acetones, methyl ethyl ketone, cyclohexanone, etc.; glycols, such as e.g. ethylene glycol, propylene glycol, glycerine; esters, such as e.g. ethyl acetate, propyl acetate, butyl acetate, amyl acetate. In principle, the solvents are known from the cited prior art, which are referred to here. However, mixtures of different solvents can also be used.

The known inks can also contain a binding agent in the form of a polymer resin, for example a polyurethane, resins with carboxylic, sulfonic or phosphonic acid groups, acrylates, vinyls, polyesters, amides, phenols, polycarbonates, epoxides, polyketones, etc. Reference is also made to the prior art relating to this.

Furthermore, different additives, such as e.g. means for adjusting the conductivity, wetting agents, moisturisers, defoaming agents etc. can be included.

Therefore, reference is made to the wide range of relevant literature relating to the usual contents of inks for inkjet printing, in order to avoid unnecessary repetition.

The additive according to the invention consists in its simplest embodiment of at least one silane and at least one organic ester of o-silica. The at least one silane acts in this case in particular as a cross-linking component and as an adhesion-promoting agent for the ink, the ester acts as a reticulating agent and likewise as an adhesion-promoting agent on the glass surface.

In the invention "silanes" are defined as compounds in which at least one, usually two, three or four alkoxy groups are bonded directly via the oxygen to the silicon atom. Silanes have the property of hydrolysing when in contact with moisture. In this way silanols (Si—OH-groups) are formed, and in subsequent condensation reactions siloxanes (Si—O—Si-groups) are formed.

In the invention silanes are used, which are preferably anhydrous, where anhydrous means that minimum traces of water are included, i.e. a residual water content of a maximum of 1 wt. %, in particular a maximum of 0.5 wt. %, is present. As a function of the hydrolysis sensitivity of the silanes also if necessary silanes with a higher water content can be used.

Preferably, silanes are used which comprise at least one functional group, which is selected from a group comprising epoxide groups, amine groups, (meth)acrylic acid groups or mercapto groups, whereby in particular those silanes are preferred which comprise at least one functional group at the end in the molecule.

Of course, silanes with several functional groups can also be used. In particular, it is preferable to use a silane, which comprises a functional group, which is coordinated with the functional group of the polymer binding agent (e.g. acrylates as functional groups etc.).

Particularly preferably, within the scope of the invention 3-glycidyloxy-propyltrimethoxysilane, 3-aminopropyltriethoxysilane and 3-methacryloxypropyltrimethoxysilane are used. The latter can be obtained for example from Sigma-Aldrich or ABCR under the said names.

However, also other silanes can be used, for example in particular substituted alkoxy silane, such as e.g. epoxy alkyloxy silane; aminoalkylalkyloxy silane, such as e.g. 4-aminopropyltriethoxysilane, [γ-(βaminoethyl-amino)-propyl]-trimethoxysilane; vinyltris-(β-methoxyethoxy)-silane, (γ-methacryloxypropyl)-trimethoxysilane, aminosilane of the formula

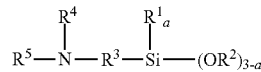

wherein R1, R2 and R3 is an alkyl group with 1 to 8 C-atoms, in particular a methyl, an ethyl- or an isopropyl group, R4 and R5 is an H or an alkyl group with 1 to 8 C-atoms, in particular a methyl, an ethyl- or an isopropyl group. Instead of the alkyl groups also at least a residue can be provided by an alkylene group with 1 to 8 C-atoms. The index a stands for a value 0, 1 or 2, in particular for 0 or 1. Preferably, a stands for 0.

Examples of such amino silanes are 3-aminopropyltrimethoxy silane, 3-aminopropyldimethoxymethyl silane, 3-amino-2-methylpropyltrimethoxy silane, 4-aminobutyltrimethoxy silane, 4-aminobutyldimethoxymethyl silane, 4-amino-3-methylbutyltrimethoxy-silane, 4-amino-3,3-dimethylbutyltrimethoxy silane, 4-amino-3,3-dimethylbutyldimethoxy-methyl silane, 2-aminoethyltrimethoxy silane, 2-aminoethyldimethoxymethyl silane, amino-methyltrimethoxy silane, aminomethyldimethoxymethyl silane, aminomethylmethoxy-dimethyl silane, N-methyl-3-aminopropyltrimethoxy silane, N-ethyl-3-aminopropyltrimethoxy silane, N-butyl-3-aminopropyltrimethoxy silane, N-cyclohexyl-3-aminopropylt-rimethoxy silane, N-phenyl-3-aminopropyltrimethoxy silane, N-methyl-3-amino-2-methyl-propyltrimethoxy silane, N-ethyl-3-amino-2-methylpropyltrimethoxy silane, N-ethyl-3-aminopropyldimethoxymethyl silane, N-phenyl-4-aminobutyltrimethoxy silane, N-phenyl-aminomethyldimethoxymethyl silane, N-Cyclohexylaminomethyldimethoxymethyl silane, N-methylaminomethyldimethoxymethyl silane, N-ethylaminomethyldimethoxymethyl silane, N-propylaminomethyldimethoxymethyl silane, N-butylaminomethyldimethoxymethyl silane, N-(2-aminoethyl)-3-aminopropyltrimethoxysilane, as well as analogues thereof with ethoxy- or isopropoxy groups instead of the methoxy groups on silicon.

In one embodiment the amino silane used can be a reaction product of an amino silane with the above formula, which comprises at least one secondary or primary amino group, with a compound comprising at least one functional group, which can react with a primary or secondary amino group, for example the epoxy silane mentioned in the description.

Additional epoxy silanes are of the formula

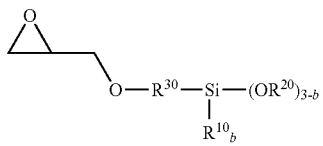

R10, R20 stand in this case for an alkyl group with 1 to 6 C-atoms, preferably for a methyl, ethyl or propyl group, for example isopropyl group. R30 stands for an alkylene group with 1 to 6 C-atoms and b for 0, 1 or 2, in particular for 0 or 1.

Examples of such epoxy silanes are 2-(3,4-epoxycyclohexyl)-ethyltrimethoxy silane, 2-(3,4-epoxycyclohexyl)-ethyltriethoxy silane, 3-glycidyloxypropyltriethoxy silane and 3-glycidyloxypropyltrimethoxy silane.

The mercapto silane can for example be a 3-mercaptopropyltrimethoxy silane or a 3-mercaptopropyltriethoxy silane.

The silane is included in the additive in a proportion, which is selected from a range with a lower limit of 1 wt. % and an upper limit of 80 wt. %. In particular, 3-glycidyloxypropyltrimethoxy silane is included in a proportion, which is selected from a range with a lower limit of 1 wt. % and an upper limit of 50 wt. %, 3-aminopropyltriethoxy silane is contained in a proportion which is selected from a range with a lower limit of 1 wt. % and an upper limit of 50 wt. % or 3-methacryloxypropyltrimethoxy silane in a proportion, which is selected from a range with a lower limit of 1 wt. % and an upper limit of 80 wt. %, if said silanes are used individually.

In general it should be noted at this point that all of the details on proportions of the additive relate to the respective total composition, however particular reference is made to a variation from this.

Also mixtures of different silanes can be used, as already mentioned. Particularly preferably, mixtures of 3-glycidyloxypropyltrimethoxy silane or 3-aminopropyltriethoxy silane or 3-methacryloxypropyltrimethoxy silane with 3-glycidyloxypropyltrimethoxy silane and 3-aminopropyltriethoxy silane and/or 3-methacryloxypropyltrimethoxy silane are used.

If a mixture of silanes is used, which as a functional group comprises an epoxide, an amine and a methacrylic acid group, a quantity ratio of said silanes can be selected from a range with a lower limit of 1:0.1:50 and an upper limit of 1:1:1.

In addition to the at least one silane the additive according to the invention contains at least one organic ester of o-silica with the general formula

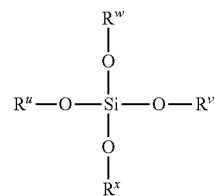

wherein Rv, Rw, Rx are formed respectively by H or a C1-C8 group and Ru is a C1-C8 group. Said residues can thus be formed by a methyl, ethyl, propyl, butyl, pentyl, hexyl, heptyl or an octyl group. Both the linear and also branched representatives of said alkyl groups are possible. Furthermore, of said higher homologus C-groups also the single or multiple unsaturated representatives thereof can be used, whereby by means of the double bonds additional reactive centres are available for the crosslinking.

In particular, preferably as esters of the o-silica tetramethylorthosilicate, tetraethylorthosilicate or tetrapropylorthosilicate are used, in order to obtain an at least almost symmetrical structure of the network.

Further examples are trimethylethylorthosilicate, dimethyldiethylorthosilicate, methyltriethylorthosilicate, triethylpropylorthosilicate, diethyldiproylorthosilicate, ethyltripropylorthosilicate, trimethylproylorthosilicate, dimethyldiproylorthosilicate, methyltriproylorthosilicate or mixtures thereof.

Such o-silicates can be obtained for example under the same name from Sigma-Aldrich or ABCR. A possible method of production is described e.g. in Hector, A. L. Chem. Soc. Rev. 2007, 36, 1745-1753 or Mackenzie, J. D.; Bescher, E. P. Acc. Chem. Res. 2007, 40, 810-818.

The proportion of the at least one orthosilicate in the additive according to the invention can be selected from a range of 1 wt. % to 90 wt. %.

A portion of the ester of the o-silica can be replaced by an organic polymer or its monomer prestages, in particular by acrylates, silicons, polyurethanes, polyamide resins, polyimide resins. Examples of this are methylmethacrylate, dimethylaminoethylmethacrylate, trimethylolpropane triacrylate, di(trimethylolpropane)-tetraacrylate, trimethylolpropane trimethacrylate, poly(propylene glycol) diacrylate, polyisoprene-graft-maleic acid monomethyl ester, poly(methylvinylether-alt-maleic acid monobutyl-ester) and copolymers of the latter.

Particularly preferable are trimethylolpropane triacrylate, di(trimethylolpropane)tetraacrylate and trimethylolpropeane trimethacrylate.

The proportion of this at least one polymer in the additive can be between 0.5 wt. % and 50 wt. %.

The additive can also contain at least one surfactant. As the surfactants anionic, cationic, non-ionic or ampholytic surfactants or mixtures thereof can be used.

Examples of anionic surfactants are surfactants comprising carboxylate, sulphate, phosphate or sulphonate-groups, such as for example amino acid derivatives, fatty alcohol ether sulphates, fatty alcohol sulphates, soaps, alkylphenol ethoxylates, fatty alcohol ethoxylates, but also alkane sulphonates, olefin sulphonates or alkyl phosphates.

Examples of non-ionic surfactants are ethoxylates, such as for example ethoxylated addition products of alcohols, such as for example polyoxyalkylene polyols, amines, fatty acids, fatty acid amides, alkylphenols, ethanol amides, fatty amines, polysiloxanes or fatty acid esters, but also alkyl or alkylphenyl polyglycol ethers, such as for example fatty alcohol polyglycol ethers, or fatty acid amides, alkyl glycosides, sugar esters, sorbitane esters, polysorbates or trialkylaminoxides, but also esters and amides made of poly(meth)acrylic acids with polyalkylene glycols or aminopolyalkylene glycols, which if necessary can be completed on one side with alkyl groups.

Examples of cationic surfactants are quaternary ammonium or phosphonium compounds, such as for example tetraalkyl ammonium salts, N,N-dialkylimidazolium compounds, dimethyldistearyl ammonium compounds, or N-alkylpyridine compounds, but in particular ammonium chloride.

Amphoteric electrolytes are included in the ampholytic surfactants, so-called ampholytes, such as for example amino acids and betaines.

Surfactants of this kind are widely available commercially.

It is an advantage if the surfactant is anhydrous, in order to avoid the premature hydrolysis of the silanes.

The proportion of the surfactant can be selected from a range of 0.5 wt. % to 50 wt. %.

It should be noted at this point, that the surfactant can also be included if necessary in the ink, or both the additive and also the ink can contain at least one surfactant.

If at least one surfactant is included in the additive to improve the bonding of the ink on the glass it is an advantage if the ratio of silane to surfactant is between 5:1 and 1:2, in particular has a value of between 3:1 to 2:3.

As an additional component the additive can contain at least one UV-initiator and/or a thermal initiator. Examples of this are Irgacure®, various phenones, various benzoins, etc. or azobisisobutyronitrile, 1,1'-azobis(cyclohexancarbonitrile), t-butyl hydroperoxide, m-chloroperbenzoic acid, dibenzoyl peroxide, di-t-butyl peroxide, etc.

Said initiator or an initiator mixture therefrom can be included in a proportion of 0.5 wt. % to 25 wt. %.

The additive according to the invention is added to an ink, in particular a graphic ink in an amount of between 5 wt. % and 70 wt. %.

Usually such inks also contain at least one viscosity regulator. It is thus an advantage if the ratio of the overall amount of viscosity regulator to the amount of additive is selected from a range with a lower limit of 0.5:1 and an upper limit of 10:1.

Examples of viscosity regulators which can be all obtained commercially, are high-viscosity organic compounds, such as e.g. polypropylene glycols, polyethylene glycols, acrylated or other functionalised deviates of (poly)propylene glycolene or (poly)ethylene glycolene, cross-linkable and non-cross-linkable resins, polyesters etc.

In the following only a few preferred examples of compositions of the additive according to the invention are given, as the range of possible compositions within the scope of the invention would exceed the scope of this description.

Example 1

10 wt. % of a 1:1:0.5:0.2 mixture of tetraethylorthosilicate, 3-methacryloxypropyltrimethoxy silane, 3-glycidyloxypropyltrimethoxy silane and 3-aminopropyltriethoxy silane were added to a UV-hardenable, non-aqueous, acrylate-based black graphic ink. As a viscosity regulator 15 wt. % of a 1:1 mixture of poly(propylene glycol)diacrylate and high-molecular polypropylene glycol was added. In order to ensure sufficient UV-crosslinking during the printing process, to the latter glass ink according to the invention an additional 5 wt. % Irgacure 819® was added. After printing on standard window glass with crosslinking by means of a standard-UV-lamp the glass printing was subsequently hardened for 15 minutes at 250° C.

Example 2

To a non-aqueous, acrylate-based cyan-coloured graphic ink 15 wt. % of a 1:1:0.5:0.2 mixture of tetraethylorthosilicate, 3-methacryloxypropyltrimethoxy silane, 3-glycidyloxypropyltrimethoxy silane and 3-aminopropyltriethoxy silane were added. As the viscosity regulator 15 wt. % of a 1:1 mixture of poly(propylene glycol)diacrylate and high-molecular polypropylenglycol was added. To ensure sufficient cross-linking in the thermal post-hardening/hardening stage, in addition 5 wt. % azobisisobutyronitrile was added to said glass ink according to the invention. After printing on standard window glass the glass print was post-hardened for 10 minutes at 200° C.

Example 3

8 wt. % of a 1:1:0.5:0.2 mixture of tetraethylortho silicate, 3-methacryloxypropyltrimethoxy silane, 3-glycidyloxypropyltrimethoxy silane and 3-aminopropyltriethoxy silane was added to a UV-hardenable, non-aqueous, acrylate-based white graphic ink. As the viscosity regulator 15 wt. % of a 1:1 mixture of poly(propylenglycol)diacrylate and high molecular polypropylene glycol was added. After printing on standard window glass by crosslinking by means of a standard-UV-lamp the glass printing was subsequently hardened for 10 minutes at 250° C.

Example 4

25 wt. % of a 1:1:0.5:0.2 mixture of tetraethylorthosilicate, 3-methacryloxypropyltrimethoxy silane, 3-glycidyloxypropyltrimethoxy silane and 3-aminopropyltriethoxy silane was added to a UV-hardenable, non-aqueous, acrylate-based yellow graphic ink. As a viscosity regulator 15 wt. % of a 1:1 mixture of trimethylolpropane triacrylate and di(trimethylolpropane)tetraacrylate was added. To ensure sufficient UV-crosslinking during the printing process an additional 5 wt. % Irgacure 819® was admixed to said glass ink according to the invention. After printing on standard window glass by crosslinking by means of a standard-UV-lamp the glass print was post-hardened for 3 minutes at 250° C.

Example 5

To a non-aqueous, acrylate-based magenta-coloured graphic ink 20 wt. % of a 1:1:0.5:0.2 mixture of tetraethylorthosilicate, 3-methacryloxypropyltrimethoxy silane, 3-glycidyloxypropyltrimethoxy silane and 3-aminopropyltriethoxy silane was added. As a viscosity regulator 15 wt. % of a 1:1 mixture of trimethylolpropantriacrylate and di(trimethylolpropane)tetraacrylate was added. To ensure sufficient crosslinking in the thermal post/hardening step to said glass ink according to the invention an additional 5 wt. % 1,1'-azobis(cyclohexancarbonitrile) was added. After printing on standard window glass the glass print was post-hardened for 10 minutes at 200° C.

Example 6

To a UV-hardening, non-aqueous, acrylate-based black graphic ink 10 wt. % of a 1:1:0.5:0.2 mixture of tetraethylorthosilicate, 3-methacryloxypropyltrimethoxy silane, 3-glycidyloxypropyltrimethoxy silane and 3-aminopropyltriethoxy silane was added. As the viscosity regulator 5 wt. % of a 1:1 mixture of polyisoprene-graft-maleic acid monomethylester, poly(methylvinylether-alt-maleic acid monobutylester) was added. To ensure sufficient UV-crosslinking during the printing process, an additional 5 wt. % Irgacure 819® was admixed to the said glass ink according to the invention. After printing on standard window glass by crosslinking by means of a standard-UV-lamp the glass print was subsequently hardened for 15 minutes at 250° C.

A commercially obtainable ink was added to the example formulations.

The proportion of silane-containing additive was for example 1 10 wt. %, for example 2 15 wt. %, example 3 8 wt. %, for example 4 25 wt. %, for example 5 20 wt. % and for example 6 10 wt. %.

Said ink formulations were printed on a commercial glass using a commercially obtainable inkjet printer and fixed by means of UV-light (see example 1, 3, 4 and 6). In the case of ink mixtures with thermal initiators (see example 2 and 5) UV-fixing can be omitted and complete hardening can be performed in the thermal post-treatment stage.

The scratch resistance of the glass prints was tested by a cross-cutting test or Scotch-tape-test, whereby excellent adhesion and scratch resistance was established for all printing patterns.

Within the scope of the invention it is possible for the premixed additive to be added to the ink, or for the individual components to be added to the ink.

To increase the amount of crosslinking it is possible for initiators to be admixed to the ink, in particular UV- or thermal initiators, as explained above.

In the case of adding at least one thermal initiator a post-treatment can be performed at a temperature of between 100° C. and 250° C., in particular for a period of between 30 seconds and 15 minutes.

If a UV-initiator is used, after printing UV-light radiation is performed, in particular for a period of between 1 second and 10 seconds.

It is also possible to add both a thermal and a UV-initiator.

The proportion of the at least one initiator in the ink can be between 0.5 wt. % and 25 wt. %.

For this example 1 was repeated with Irgacure 819® as the initiator and the measurements were taken according to the above description. It was established in this case that below 0.5 wt. % there is insufficient crosslinking, whereas with initiator amounts above 25 wt. %, in particular 10 wt. %, there is no significant improvement in the degree of crosslinking.

During the printing of at least one colour the ink droplets can be fixed by UV-light or thermal pinning. In the case of sufficient prefixing (e.g. by UV- or thermal pinning) of the ink droplets the simultaneous printing of several colours is possible.

The exemplary embodiments show possible embodiment variants of the additive, whereby it should be noted at this point that the invention is not restricted to the embodiment variants shown in particular, but rather various different combinations of the individual embodiment variants are also possible and this variability, due to the teaching on technical procedure, lies within the ability of a person skilled in the art in this technical field.

The invention claimed is:

1. An ink, comprising:
    a solvent;
    a binding agent;
    a pigment; and
    an additive, wherein the additive comprises:
        a silane with a methacrylic acid group;
        at least one reticulating agent based on an organic ester of o-silica,
        a silane with an epoxide group; and
        a silane with an amino group, wherein the ratio by weight of said silanes with epoxide or amino or the methacrylic acid group is in the range of 1:0.1:50 to 1:1:1.

2. The ink according to claim 1, wherein the proportion of additive is selected from a range with a lower limit of 5 wt. % and an upper limit of 70 wt. %.

3. The ink according to claim 1, further comprising at least one viscosity regulator, wherein the ratio of the total amount of viscosity regulator to the amount of additive is selected from a range with a lower limit of 0.5:1 and an upper limit of 10:1.

4. The ink according to claim 1, wherein the ester of o-silica is selected from a group of compounds with the general formula $SiO_4R''R'R'''R^x$, wherein $R'$, $R'''$, $R^x$ are formed respectively by H or a $C_1$-$C_8$ group and $R''$ is a $C_1$-$C_8$ group.

5. The ink according to claim 1, wherein the proportion of the ester of o-silica is selected from a range with a lower limit of 1 wt. % and an upper limit of 90 wt. %.

6. The ink according to claim 1, wherein the reticulating agent comprises an organic polymer or its monomer prestage.

7. The ink according to claim 6, wherein the organic polymer is selected from the group consisting of acrylate resins, silicon resins, polyurethane resins, polyamide resins, and polyimide resins.

8. The ink according to claim 6, wherein the proportion of organic polymer is selected from a range with a lower limit of 0.5 wt. % and an upper limit of 50 wt. %.

9. The ink according to claim 1, wherein the functional group is arranged terminally on the silane.

10. The ink according to claim 1, wherein the silane with the epoxy group is 3-glycidyloxypropyltrimethoxy silane, the silane with the amino group is 3-aminopropyltriethoxy silane, and the silane with the methacrylic acid group is 3-methacryloxypropyltrimethoxy silane.

11. The ink according to claim 1, wherein the proportion of the silanes is selected from a range with a lower limit of 1 wt. % and an upper limit of 80 wt. %.

12. The ink according to claim 1, further comprising at least one UV initiator and/or a thermal initiator.

13. The ink according to claim 12, wherein the proportion of the at least one initiator is selected from a range with a lower limit of 0.5 wt. % and an upper limit of 25 wt. %.

14. The ink according to claim 1, further comprising at least one surfactant.

15. The ink according to claim 14, wherein the proportion of surfactant is selected from a range with a lower limit of 0.5 wt. % and an upper limit of 50 wt. %.

* * * * *